(12) United States Patent
Vendamme et al.

(10) Patent No.: US 12,258,444 B2
(45) Date of Patent: Mar. 25, 2025

(54) POLYESTERS FROM LIGNIN-BASED MONOMERS

(71) Applicant: VITO NV, Mol (BE)

(72) Inventors: Richard Vendamme, Mol (BE); Pablo Ortiz Urraca, Mol (BE)

(73) Assignee: VITO NV, Mol (BE)

( * ) Notice: Subject to any disclaimer, the term of this patent is extended or adjusted under 35 U.S.C. 154(b) by 697 days.

(21) Appl. No.: 17/607,650

(22) PCT Filed: Apr. 28, 2020

(86) PCT No.: PCT/EP2020/061736
§ 371 (c)(1),
(2) Date: Oct. 29, 2021

(87) PCT Pub. No.: WO2020/221730
PCT Pub. Date: Nov. 5, 2020

(65) Prior Publication Data
US 2022/0213264 A1 Jul. 7, 2022

(30) Foreign Application Priority Data
Apr. 30, 2019 (EP) .................................... 19172061

(51) Int. Cl.
*C08G 63/672* (2006.01)
(52) U.S. Cl.
CPC .................................. *C08G 63/672* (2013.01)
(58) Field of Classification Search
CPC .................................................. C08G 63/672
(Continued)

(56) References Cited

U.S. PATENT DOCUMENTS

| 5,227,279 A | 7/1993 | Kawabata |
| 2019/0002630 A1 | 1/2019 | Nguyen et al. |

FOREIGN PATENT DOCUMENTS

| JP | H06157735 A | * | 6/1994 |
| WO | 2011143379 A2 | | 11/2011 |

(Continued)

OTHER PUBLICATIONS

Oliver Kreye et al., "Renewable Aromatic-Aliphatic Copolyesters Derived from Rapeseed," Macromolecular Chemistry and Physics, Apr. 30, 2013 (14pages). (Year: 2013).*

(Continued)

*Primary Examiner* — Ling Siu Cho
*Assistant Examiner* — Ronald Grinsted
(74) *Attorney, Agent, or Firm* — Fitch, Even, Tabin & Flannery LLP (57) ABSTRACT

The invention is directed to polyesters comprising the following repeating unit of formula (I) wherein: $R^1$ and $R^2$ independently represent H or $CH_3$, $R^3$ and $R^4$ independently represent H or $OCH_3$, $R^5$ independently represents $C_{1-16}$alkyl-$O(C=O)R^7(C=O)$; $C_{1-16}$alkyl$(C=O)$; $(C=O)R^7(C=O)$; $C_{1-16}$alkyl$(C=O)OR^7O(C=O)C_{1-16}$alkyl; $C_{1-16}$alkyl$(C=O)OR^7$ or $(C=O)C_{2-3}$alkyl$(C=O)OR^7O(C=O)C_{2-3}$alkyl, $R^7$ independently represents $C_{1-20}$alkyl; benzene or furan, $R^6$ represents CH2 or $(C=O)$, n=0-3, m≥10. The invention is also directed to a process for the preparation of these polyesters, wherein a monomer or monomer mixture is heated in the presence of a catalyst to a temperature of 100-300° C. under a pressure below 10 kPa.

13 Claims, 5 Drawing Sheets

(58) Field of Classification Search
USPC .......................................................... 528/300
See application file for complete search history.

(56) References Cited

FOREIGN PATENT DOCUMENTS

| WO | 2014075057 A8 | 5/2014 |
| WO | 2016005837 A1 | 1/2016 |
| WO | 2017123587 A1 | 7/2017 |

OTHER PUBLICATIONS

Chinese Application No. 2020800353647; First Office Action Dated Mar. 22, 2023, with translation, 8 pages.
Oliver Kreye et al., "Renewable Aromatic-Aliphatic Copolyesters Derived from Rapeseed," Macromolecular Chemistry and Physics, Apr. 30, 2013 (14 pages).
International Search Report and Written Opinion mailed Sep. 16, 2020 for International Application No. PCT/EP2020/061736, 9 pages.
Sun, Zhuohua et al., "Bright Side of Lignin Depolymerization: Toward New Platform Chemicals," Chem. Rev., 2018, 118, 614-678.
Schutyser, W. et al., "Chemicals from lignin: an interplay of lignocellulose fractionation, depolymerisation, and upgrading," Chem. Soc. Rev., 2018, 47, 852-908.

* cited by examiner

POLYESTERS FROM LIGNIN-BASED MONOMERS

TECHNICAL FIELD

The present invention is directed to polyesters. These polyesters can replace polyethylene terephthalate (PET) in many applications.

BACKGROUND ART

Polyethylene terephthalate (PET) is one of the most widely produced polymers in the world. It is naturally transparent and is extensively used in daily life. Its main uses are as synthetic fibers (termed "polyester") and for bottling and packaging, due to its excellent moisture barrier. PET has interesting properties such as being strong but at the same time lightweight and flexible. Moreover, it is safe, non-toxic and can be easily recycled. Polyethylene terephthalate, as its name indicates, is synthesized by the condensation between terephthalic acid and ethylene glycol, both derived from fossil resources.

2,5-furandicarboxylic acid (FDCA) is a bio-based alternative to terephthalic acid that has gained increased attention in the last years. FDCA can be derived from sugars and it has shown the ability to replace terephthalic acid in a variety of applications. Among them, the most remarkable example is the production of polyethylene furanoate (PEF), which gives the resulting polymer better barrier, thermal and mechanical properties when compared to PET. Moreover, the polymer can be fully bio-based. However, the synthesis of aromatic structures from sugars is not the most straightforward pathway, especially considering that aromatic structures can already be found in nature.

SUMMARY OF THE INVENTION

There is a need to find a different bio-based substitute for terephthalic acid to be able to replace the fossil-derived aromatics in PET.

One object of the invention is to provide bio-based polyesters, which polyesters are easy to produce and can be recycled.

The present invention is directed to a polyester comprising the repeating unit according to formula I:

wherein:
$R^1$ and $R^2$ independently represent H or $CH_3$,
$R^3$ and $R^4$ independently represent H or $OCH_3$,
$R^5$ independently represents $C_{1-16}$alkyl-O(C=O)$R^7$(C=O); $C_{1-16}$alkyl(C=O); (C=O)$R^7$(C=O); $C_{1-16}$alkyl(C=O)O$R^7$O(C=O)$C_{1-16}$alkyl; $C_{1-16}$alkyl(C=O)O$R^7$ or (C=O)$C_{2-3}$alkyl(C=O)O$R^7$O(C=O)$C_{2-3}$alkyl,
$R^7$ independently represents $C_{1-20}$alkyl; benzene or furan,
$R^6$ represents $CH_2$ or (C=O),
n=0-3,
m≥10.

Advantageously, $R^5$ independently represents $C_{1-16}$alkyl-O(C=O)$R^7$(C=O); $C_{1-16}$alkyl(C=O); (C=O)$C_{2-3}$alkyl(C=O); $C_{1-16}$alkyl(C=O)O$R^7$O(C=O)$C_{1-16}$alkyl; $C_{1-16}$alkyl(C=O)O$R^7$ or (C=O)$C_{2-3}$alkyl(C=O)O$R^7$O(C=O)$C_{2-3}$ alkyl.

The polyesters according to the invention have the advantage that they can be prepared from fully bio-based monomers. Further, the polyesters according to the invention can be used for the same products as existing polyesters, for example PET, which are made from fossil-derived aromatics.

The polyesters according to the invention can be prepared from lignin-based monomers. Lignin is a by-product of cellulose production. As a consequence of the harsh reaction conditions used to separate lignin from polysaccharides, lignin degradation and condensation takes place. Most of the depolymerization protocols for cellulose make use of high temperatures and harsh reaction conditions (acidic or basic) which result in low yield of diverse monomers. Nevertheless, mild fractionation and/or depolymerization conditions of lignin and strategies to stabilize the intermediates formed during depolymerization (either by using reductive catalysts or additives) allow the isolation of monomers from lignin in good yields and selectivity (*Chem. Rev.* 2018 118, 614; *Chem. Soc. Rev.* 2018, 47, 852).

There are a few examples of polymers based on monomers that are derived from lignin. WO2011143379A2 describes the transformation of vanillin into acetyldihydroferulic acid and its polymerization to poly(dihydroferulic acid). Further, WO2014075057A8 describes a thermoplastic copolymer comprising poly(dihydroferulic acid-co-ferulic acid) and WO2017123587A1 describes the synthesis of polymers from (hydroxy)(alkyl)(dihydro)ferulic acid and/or (hydroxy)(alkyl)(dihydro)cumaric acid. A disadvantage of these polymers is however that the polymers are based on only a few monomers and the properties of the resulting polymers cannot be tuned. The polymers can therefore not replace PET in all applications.

The polyesters according to the invention can be prepared from lignin-based monomers. The lignin-based monomers can be prepared by modification of lignin-based precursors. The lignin-based precursors are 4-hydroxyalkylphenols according to formula A:

wherein:
$R^1$ and $R^2$ independently represent H or $CH_3$,
$R^3$ and $R^4$ independently represent H or $OCH_3$,
R=$CH_3$ or OH,
n=0-4.

Both lignin-based molecules and model compounds, such as petroleum-derived compounds whose structure reproduces the lignin-based molecules, can be used as precursors according to the invention. Both lignin-based molecules and model compounds are thus referred to as lignin-based precursors.

The lignin-based monomers can be obtained by modification of the phenolic hydroxyl group and/or the modification of the aliphatic hydroxyl group of the lignin-based precursor according to formula A, in particular when such an aliphatic hydroxyl group is present (i.e. when in formula A R is OH and n is 1-4).

Polyesters

The polyesters according to the invention comprise the repeating unit according to formula I:

(I)

wherein:
R$^1$ and R$^2$ independently represent H or CH$_3$,
R$^3$ and R$^4$ independently represent H or OCH$_3$,
R$^5$ independently represents C$_{1-16}$alkyl-O(C=O)R$^7$ (C=O); C$_{1-16}$alkyl(C=O); (C=O)R$^7$(C=O); C$_{1-16}$alkyl(C=O)OR$^7$O(C=O)C$_{1-16}$alkyl; C$_{1-16}$alkyl(C=O)OR$^7$ or (C=O)C$_{2-3}$alkyl(C=O)OR$^7$O(C=O)C$_{2-3}$alkyl,
R$^7$ independently represents C$_{1-20}$alkyl; benzene or furan,
R$^6$ represents CH$_2$ or (C=O),
n=0-3,
m≥10.

According to one preferred embodiment of the invention, the polyesters comprise a repeating unit of formula II:

(II)

wherein:
R$^1$ and R$^2$ independently represent H or CH$_3$,
R$^3$ and R$^4$ independently represent H or OCH$_3$,
R$^5$ represents C$_{1-16}$alkyl or (C=O)R$^7$,
R$^7$ represents C$_{1-20}$alkyl; benzene or furan,
n=0-3,
m≥10.

Advantageously R$^5$ represents C$_{1-16}$alkyl or (C=O)C$_{2-3}$alkyl.

Advantageously, R$^7$ represents C$_{1-20}$alkyl.

According to a second preferred embodiment of the invention, the polyesters comprise a repeating unit of formula III:

(III)

wherein:
R$^1$ and R$^2$ independently represent H or CH$_3$,
R$^3$ and R$^4$ independently represent H or OCH$_3$,
R$^5$ independently represents C$_{1-16}$alkyl-O(C=O)R$^7$ (C=O),
R$^7$ independently represents C$_{1-20}$alkyl; benzene or furan,
n=0-3,
m≥10.

According to a third preferred embodiment of the invention, the polyesters comprise a repeating unit of formula IV:

(IV)

wherein:
R$^1$ and R$^2$ independently represent H or CH$_3$,
R$^3$ and R$^4$ independently represent H or OCH$_3$,
R$^5$ independently represents C$_{1-16}$alkyl(C=O)OR$^7$O(C=O)C$_{1-16}$alkyl; C$_{1-16}$alkyl(C=O)OR$^7$; or (C=O)C$_{2-3}$alkyl(C=O)OR$^7$O(C=O)C$_{2-3}$alkyl,
R$^7$ independently represents C$_{1-20}$alkyl; benzene or furan,
R$^6$ represents CH$_2$ or (C=O),
n=0-3,
m≥10.

Process

The polyesters according to formulas I-IV can be prepared by heating a monomer or monomer mixture in the presence of a catalyst to a temperature of 100-300° C. under a pressure below 10 kPa.

The temperature during the reaction is preferably 120-280° C., more preferably 130-260° C. and most preferably 150-240° C. The temperature may vary during the reaction time. It is for example, possible to start the reaction at a lower temperature and raise the temperature afterwards.

At least a part of the reaction is usually carried out under a pressure below 10 kPa. This is a vacuum pressure, which is used during the reaction for the removal of water (in case of esterification reaction) or alcohol (in case of transesterification reaction). The pressure is preferably below 8 kPa, more preferably below 5 kPa, most preferably below 2 kPa.

The reaction time is typically between 1 and 50 hours, preferably between 5 and 40 hours, more preferably between 10 and 30 hours.

The catalyst can be any esterification catalyst. The catalyst preferably is chosen from a metal oxide such as Sb$_2$O$_3$, GeO$_2$, TiO$_2$, PbO or MgO; a metal alkoxide such as Ti(OC$_4$H$_9$)$_4$, Ti[OCH(CH$_3$)$_2$]$_4$ or Zr(OC$_4$H$_9$)$_4$; a metal acetate such as Mg(OCOCH$_3$)$_2$ Mn(OCOCH$_3$)$_2$,

$Zn(OCOCH_3)_2$, $Sb(OCOCH_3)_3$ or $Sn[OCO(C_2H_5)CH(CH_2)CH_3]_2$; a (Lewis) acid such as $H_2SO_4$, polyphosphoric acid or SnCl; or any combinations thereof. The catalyst is used in a low amount, preferably in an amount between 0.001 and 5 mol %, more preferably between 0.005 and 4 mol %, most preferably between 0.01 and 3 mol %.

The catalyst can be added in a single charge or it can be added in more than one charges. Adding the catalyst in more than one charges, specially using two different catalysts, is suited when the polymerization is carried out in two steps. For example, a first step in which oligomers are formed, and a second step for the polycondensation. Polyester formation might also be carried out in one step.

The copolymers are prepared by condensation of lignin-based monomers and other comonomers. The molar fraction of lignin-based monomers to other comonomers is typically between 0.1-0.9, but preferably between 0.3-0.7, more preferably between 0.4-0.6 and most preferably between 0.45-0.55.

Monomers

The lignin-based precursors are 4-hydroxyalkylphenols according to formula A:

(A)

wherein:
$R^1$ and $R^2$ independently represent H or $CH_3$,
$R^3$ and $R^4$ independently represent H or $OCH_3$,
R=$CH_3$ or OH,
n=0-4.

The lignin-based monomers can be obtained by modification of the phenolic hydroxyl group and/or the modification of the aliphatic hydroxyl group of the lignin-based precursor according to formula A, in particular when such an aliphatic hydroxyl group is present (i.e. when in formula A R is OH and n is 1-4).

Reactions to functionalize the precursor can target either one or both hydroxyl groups of the lignin-based monomers, in particular when the lignin-based precursor comprises both a phenolic and an aliphatic hydroxyl group. Because of the different reactivity of the phenolic and aliphatic hydroxyl groups, selective functionalization of the phenolic hydroxyl group is possible.

According to an embodiment, lignin-based monomers can be prepared that have a structure according to formula V:

(V)

wherein:
$R^1$ and $R^2$ independently represent H or $CH_3$,
$R^3$ and $R^4$ independently represent H or $OCH_3$,
$R^5$ represents $C_{1-16}$alkyl or (C=O)$R^7$,
$R^7$ independently represents $C_{1-20}$alkyl; benzene or furan,
$R^8$ represents H or $C_{1-4}$alkyl,
n=0-3.

Advantageously $R^5$ represents $C_{1-16}$alkyl or (C=O)$C_{2-3}$alkyl.

Advantageously, $R^7$ represents $C_{1-20}$alkyl.

The lignin-based monomers according to formula V can be synthesized from a lignin-based precursor according to formula A, wherein R is OH and n (of formula A) is 1-4 (in other words, n in formula V is 0-3). In other words, the lignin-based precursor according to formula A comprises a phenolic hydroxyl group and an aliphatic hydroxyl group.

The lignin-based monomers according to formula V can be synthesized by modification of the phenolic hydroxyl group of lignin-based precursors in formula A, so that a terminal carboxylic acid or ester group is incorporated. Such functionalization might be carried out by reaction with different chemicals, such as, but not limited to, molecules containing a halogen and a carboxylic acid, such as chloroacetic acid, bromoacetic acid, 3-chloropropionic acid, 3-bromopropionic acid, 4-chlorobutyric acid and the like; molecules containing a halogen and a terminal ester, such as methyl 3-chloropropionate, methyl 4-chlorobutyrate and the like; cyclic anhydrides such as succinic anhydride or glutaric anhydride; cyclic lactones such as γ-butyrolactone or δ-valerolactone.

The selective functionalization of the phenolic hydroxyl group can be achieved in different ways. One option is by using a base that will deprotonate the phenolic hydroxyl but not the aliphatic hydroxyl. Examples of common bases that meet this criteria include, but are not limited to: ammonia, metal hydroxides $M(OH)_x$, preferably alkali metal hydroxides, such as NaOH or KOH, and carbonate salts with the formula $M_x(CO_3)_y$, such as $Na_2CO_3$ or $K_2CO_3$.

In the case that the functionalization results in the incorporation of a carboxylic acid group, it can later be converted into its ester by a transesterification reaction with an alcohol of up to four carbon atoms, but preferably methanol is used.

According to another embodiment, lignin-based monomers can be prepared that have a structure according to formula VI:

(VI)

wherein:
$R^1$ and $R^2$ independently represent H or $CH_3$,
$R^3$ and $R^4$ independently represent H or $OCH_3$,
$R^5$ independently represents $C_{1-16}$alkyl,
n=0-3.

The lignin-based monomers according to formula VI can be synthesized from a lignin-based precursor according to formula A, wherein R is OH and n (of formula A) is 1-4 (in other words, n in formula VI is 0-3). In other words, the lignin-based precursor according to formula A comprises a phenolic hydroxyl group and an aliphatic hydroxyl group.

Monomers described in formula VI can be synthesized by modification of the phenolic hydroxyl group of lignin-based precursors in formula A. The phenolic hydroxyl can be reacted to attach a terminal aliphatic hydroxyl group. This reaction can be performed with different chemicals, such as, but not limited to, cyclic ethers, such as tetrahydrofuran, ethylene oxide or propylene oxide; cyclic carbonates such as ethylene carbonate or propylene carbonate; and haloalcohols, such as 2-chloroethanol, 2-iodoethanol, 3-chloro-1-propanol, 3-bromo-1-propanol and 4-chlorobutanol. The functionalization of the phenolic hydroxyl group will lead to the units listed in formula VI where $R^5$ is an alkyl chain with 1-16 carbon atoms.

The selective functionalization of the phenolic hydroxyl group can be achieved in different ways. One option is by using a base that will deprotonate the phenolic hydroxyl, but not the aliphatic hydroxyl. Examples of common bases that meet this criteria include, but are not limited to: ammonia, metal hydroxides $M(OH)_x$, preferably alkali metal hydroxides (such NaOH or KOH) and carbonate salts with the formula $M_x(CO_3)_y$ (such as $Na_2CO_3$ or $K_2CO_3$).

According to a further embodiment, lignin-based monomers can be prepared that have a structure according to formula VII:

(VII)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^7$,
$R^7$ independently represents $C_{1-20}$alkyl; benzene or furan,
$R^6$ represents H or $C_{1-4}$alkyl,
n=0-3.

Advantageously, $R^5$ independently represents $C_{1-16}$alkyl or $(C=O)C_{2-3}$alkyl.

Advantageously, $R^7$ represents $C_{1-20}$alkyl.

The lignin-based monomers according to formula VII can be synthesized from a lignin-based precursor according to formula A, wherein R is OH and n (of formula A) is 1-4 (in other words, n in formula VII is 0-3). In other words, the lignin-based precursor according to formula A comprises a phenolic hydroxyl group and an aliphatic hydroxyl group.

Monomers described in formula VII can be synthesized by modification of both the aliphatic and the phenolic hydroxyl group of lignin-based precursors in formula A. Both the aliphatic and the phenolic hydroxyl can be modified to incorporate a terminal carboxylic acid or an ester. The functionalization of both hydroxyl groups may be carried out in one step or in two steps. In the second case, first the monomers described in formula V are prepared and the aliphatic hydroxyl is then modified. The chemical modification can be achieved with different chemicals, such as but not limited to: molecules containing a halogen and a carboxylic acid, such as chloroacetic acid, bromoacetic acid, 3-chloropropionic acid, 3-bromopropionic acid, 4-chlorobutyric acid and the like; molecules containing a halogen and a terminal ester, such as methyl 3-chloropropionate, methyl 4-chlorobutyrate and the like; cyclic anhydrides such as succinic anhydride and glutaric anhydride; cyclic lactones such as γ-butyrolactone or δ-valerolactone. The functionalization of both the aliphatic and the phenolic hydroxyl group can be achieved using a base with a higher pKa than both aliphatic and aromatic OH. Examples of such bases include but are not limited to metal hydrides such sodium hydride; metal alkoxides such as sodium ethoxide; metal amides such as sodium amide, lithium diisopropylamide, lithium diethylamide; organolithium compounds such as butyl lithium.

According to a further embodiment, lignin-based monomers can be prepared that have a structure according to formula VIII:

(VIII)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^7$,
$R^7$ independently represents $C_{1-20}$alkyl; benzene or furan,
$R^6$ independently represents H or $C_{1-4}$alkyl,
n=0-3.

Advantageously, $R^5$ independently represents $C_{1-16}$alkyl or $(C=O)C_{2-3}$alkyl.

Advantageously, $R^7$ represents $C_{1-20}$alkyl.

The lignin-based monomers according to formula VIII can be synthesized from a lignin-based precursor according to formula A, wherein R is OH and n (of formula A) is 1-4 (in other words, n in formula VIII is 0-3). In other words, the lignin-based precursor according to formula A comprises a phenolic hydroxyl group and an aliphatic hydroxyl group.

Monomers described in formula VIII can be synthesized by modification of both the aliphatic and the phenolic hydroxyl group of lignin-based precursors in formula A. Two reactions are required. First, the phenolic hydroxyl is modified with the chemistry described in previous embodiments to anchor an aliphatic hydroxyl or a carboxylic acid group. Then an oxidation reaction is performed, which converts the aliphatic hydroxyl group(s) into carboxylic acids. If a carboxylic acid group is attached to the phenolic hydroxyl, the aliphatic hydroxyl will be oxidized to the carboxylic acid. If an aliphatic hydroxyl was attached to the phenolic hydroxyl, both aliphatic hydroxyls will be oxidized to carboxylic acids. The oxidation can be carried out in two steps, namely first from the alcohol to the aldehyde and subsequently to the acid, or in one step, from the alcohol to the acid. The latter is preferred. Several reagents can be used, such as, but not limited to, chromium oxides (Jones reagent, $CrO_3/H_5IO_6$); ruthenium oxides or chlorides ($RuCl_3/H_5IO_6$, $RuCl_3/K_2S_2O_8$, $RuO_4$); $Cu(MnO_4)_2$ oxidation; TEMPO (2,2,6,6-tetramethylpiperidinyl-1-oxy)-catalysed oxidation with sodium hypochlorite or with trichloroisocianuric acid; and methods using peroxides. The resulting dicarboxylic acids can be converted to the corresponding esters by transesterification reaction.

Polymers

The polymers according to formula I can be prepared by the polymerization process as described above.

Mixtures of monomers can be utilized in the polymerization process, some of the substituents ($R^1$, $R^2$, $R^3$ and $R^4$) might be different in the repeating units. Therefore, the term independently in the formula, indicates that within the repeating units in the polymer the substituents ($R^1$, $R^2$, $R^3$ and $R^4$) can be elected independently of one another. Mixtures of dicarboxylic acids, mixtures of diesters and mixtures of diols can be used, and therefore the term independently for $R^7$, $C_{1-20}$alkyl, $C_{1-16}$alkyl and $C_{2-3}$alkyl represents an alkyl chain with the listed number of carbon atoms with their corresponding hydrogen atoms. In the following embodiments, a more detailed description of the polymers and the way of synthesizing them will be provided.

The homopolymers are the result of a polymerization reaction of lignin-based monomers with one aliphatic hydroxyl and one carboxylic acid functionality, i.e. monomers obtained from a precursor according to formula A, wherein R is OH and n is 1-4.

In one embodiment, homopolymers with the following repeating formula (formula II) are described. Within the context of the present invention, the repeating units of the homopolymers in formula II are not necessarily the same based on different ($R^1$, $R^2$, $R^3$, $R^4$ and $R^5$) substituents in the repeating units. In a preferred embodiment the repeating units of the homopolymers in formula II are the same.

(II)

wherein:
$R^1$ and $R^2$ independently represent H or $CH_3$,
$R^3$ and $R^4$ independently represent H or $OCH_3$,
$R^5$ represents $C_{1-16}$alkyl or (C=O)$R^7$,
$R^7$ represents $C_{1-20}$alkyl; benzene or furan,
n=0-3,
m≥10.

Advantageously $R^5$ represents $C_{1-16}$alkyl or (C=O)$C_{2-3}$alkyl. Advantageously, $R^7$ represents $C_{1-20}$alkyl.

The homopolymers in formula II are prepared from monomers described in formula V according to the above-mentioned polymerization process. Formula II also represents polymers formed from the reaction of lignin-based precursors according to formula A, wherein R is OH and n is 1-4, and an aliphatic, cycloaliphatic or aromatic diacid.

Besides homopolymers, the present invention also provides copolymers comprising either lignin-based monomers functionalized to form diols or lignin-based monomers functionalized to form dicarboxylic acids or diesters.

In one embodiment, copolymers with the following repeating formula (formula III) are described. Within the context of the present invention, the repeating units of the copolymers in formula III are not necessarily the same based on different ($R^1$, $R^2$, $R^3$, $R^4$ and $R^5$) substituents in the repeating unit. In a preferred embodiment, the repeating units of the copolymers in formula III are the same.

(III)

wherein:
$R^1$ and $R^2$ independently represent H or $CH_3$,
$R^3$ and $R^4$ independently represent H or $OCH_3$,
$R^5$ independently represents $C_{1-16}$alkyl-O(C=O)$R^7$(C=O),
$R^7$ independently represents $C_{1-20}$alkyl; benzene or furan,
n=0-3,
m≥10.

The copolymers of formula III are synthesized from the condensation between monomers in formula VI and a dicarboxylic acid (or a mixture of dicarboxylic acids) or a diester (or a mixture of diesters) such as represented herein below (formula IX), according to the above-mentioned polymerization process. Therefore, also $R^7$ can vary in the polymeric structure. It is also possible to transform the dicarboxylic acids into their esters prior to reaction by transesterification with an alcohol of up to four carbon atoms, but preferably methanol is used. Furthermore, additional diols or diacids can be added in order to tune the properties of the resulting polymer.

(VI)

wherein:
$R^1$ and $R^2$ independently represent H or $CH_3$,
$R^3$ and $R^4$ independently represent H or $OCH_3$,
$R^5$ independently represents $C_{1-16}$alkyl,
n=0-4, preferably n=0-3.

(IX)

wherein:
$R^7$ independently represents $C_{1-20}$alkyl; benzene or furan,
$R^8$ represents H or $C_{1-4}$alkyl.

The aliphatic dicarboxylic acids according to formula IX ($R^8$ representing H) comprising 3-22 carbon atoms include, but are not limited to, oxalic acid, succinic acid, glutaric acid, adipic acid, pimelic acid, suberic acid, azelaic acid, sebacic acid, dodecanoic acid, tridecanoic acid, tetradecanoic acid, muconic acid or a mixture of two or more hereof; dimer fatty acids such as Pripol 1009 from Croda® or Radicarboxylic acid 0976 from Oleon®; and a mixture of two or more hereof. The aromatic dicarboxylic acids can be 2,5-furandicarboxylic acid, phtalic acid, isophtalic acid, terephtalic acid, any isomer of naphthalenedicarboxylic acid, or a mixture of two or more hereof. The above mentioned acids can all be bio-based.

The esters of the above mentioned dicarboxylic acids might be used as well in the condensation ($R^8$ representing $C_{1-4}$alkyl).

Mixtures of dicarboxylic and tricarboxylic acids might be used. This might be required to expand the functionality when there are some monofunctional monomers present in the monomer mixture that would act as a chain end for the polymer. Tricarboxylic acids that might be used in combination with the above mentioned dicarboxylic acids include but are not limited to citric acid, isocitric acid, propane 1,2,3, tricarboxylic acid trimesic acid. Mixtures of dimer and trimer fatty acids such as Pripol 1006, Pripol 1025 and Pripol 1040 from Croda® might also be used. Polyacids such as tannic acid might also be used in combination with dicarboxylic acids. The esters of the above mentioned dicarboxylic acids might be used as well in the condensation reaction.

In another embodiment, copolymers with the following repeating formula (formula IVa) are described. Within the context of the present invention, the repeating units of the copolymers in formula IVa are not necessarily the same based on different ($R^1$, $R^2$, $R^3$, $R^4$, $R^5$ and $R^7$) substituents in the repeating units. In a preferred embodiment, the repeating units of the homopolymers in formula IVa are the same.

(IVa)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^{50}$,
$R^{50}$ independently represents $C_{1-20}$alkyl; benzene or furan, advantageously $R^{50}$ represents $C_{2-3}$alkyl,
$R^7$ independently represents $C_{2-20}$alkyl; benzene or $CH_2$furan$CH_2$,
n=0-2,
m≥10.

The copolymers with formula IVa can be synthesized from the condensation between monomers in formula VII and a diol or a mixture of diols, such as represented herein below (formula X), according to the above mentioned polymerization process. Therefore, $R^7$ can vary in the polymeric structure. Lignin-derived monomers might be dicarboxylic acids or diesters. The latter can be derived from the dicarboxylic acids by transesterification. Furthermore, additional diols or diacids can be added in order to tune the properties of the resulting polymer.

(VII)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^{50}$,
$R^7$ independently represents $C_{1-20}$alkyl; benzene or furan,
$R^6$ represents H or $C_{1-4}$alkyl,
n=0-3.
Advantageously, $R^{50}$ represents $C_{2-3}$alkyl.

(X)

wherein:
$R^7$ independently represents $C_{2-20}$alkyl; benzene or $CH_2$furan$CH_2$.

The aliphatic diols comprising 2-20 carbon atoms include but are not limited to ethylene glycol, diethylene glycol, 1,3-propanediol, propane-1,2-diol, 1,4-butanediol, 1,6-hexanediol or a mixture of two or more hereof; dimer diols such as Radianol 1990 from Oleon® or a mixture of two or more hereof. Cycloaliphatic diols include, but are not limited to, isosorbide, 1,3-cyclohexanedimethanol, 1,4-cyclohexanedimethanol or a mixture of two or more hereof. The above mentioned diols can all be bio-based. The aromatic diols comprise, but are not limited to, catechol, resorcinol, hydroquinone and furan-2,5-diyl)dimethanol. Besides diols, polyols can be used. These include, but are not limited to, glycerol, trimethylolpropane, erithriol and pentaerythritol. Mixtures of diols and polyols can be used. This is especially interesting to expand the functionality when there are some monofunctional monomers present in the monomer mixtures that would act as a chain end.

In another embodiment, copolymers with the following repeating formula (formula IVb) can be synthesized from the condensation between monomers in formula VIII and a diol or a mixture of them according to the above mentioned polymerization reaction. Within the context of the present invention, the repeating units of the copolymers in formula IVb are not necessarily the same based on different ($R^1$, $R^2$, $R^3$, $R^4$, $R^5$ and $R^7$) substituents in the repeating units. In a preferred embodiment, the repeating units of the polymers in Formula IVb are the same.

(IVb)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^{50}$, $R^{50}$ independently represents $C_{1-20}$alkyl; benzene or furan,
$R^7$ independently represents $C_{2-20}$alkyl; benzene or $CH_2$furan$CH_2$,
n=0-2,
m≥10.

Advantageously, $R^{50}$ represents $C_{2-3}$alkyl.

The copolymers with formula IVb are synthesized from the condensation between monomers in formula VIII and a diol or a mixture of diols as represented herein below (formula XI), according to the above mentioned polymerization process. Therefore, $R^7$ can vary in the polymeric structure. Lignin-derived monomers in formula VIII might be dicarboxylic acids or diesters. The latter can be derived from the dicarboxylic acids by transesterification. Furthermore, additional diols or diacids can be added in order to tune the properties of the resulting polymer.

(VIII)

wherein:
$R^1$ and $R^2$ independently represent H or $CH_3$,
$R^3$ and $R^4$ independently represent H or $OCH_3$,
$R^5$ independently represents $C_{1-16}$alkyl or $(C=O)R^{50}$,
$R^7$ independently represents $C_{1-20}$alkyl, benzene or furan,
$R^6$ independently represents H or $C_{1-4}$alkyl,
n=0-3.

Advantageously, $R^{50}$ represents $C_{2-3}$alkyl.

(XI)

$R^7$ independently represents $C_{2-20}$alkyl; benzene or $CH_2$furan$CH_2$.

Advantageously, $R^7$ independently represents $C_{20}$alkyl.

Figure 5:
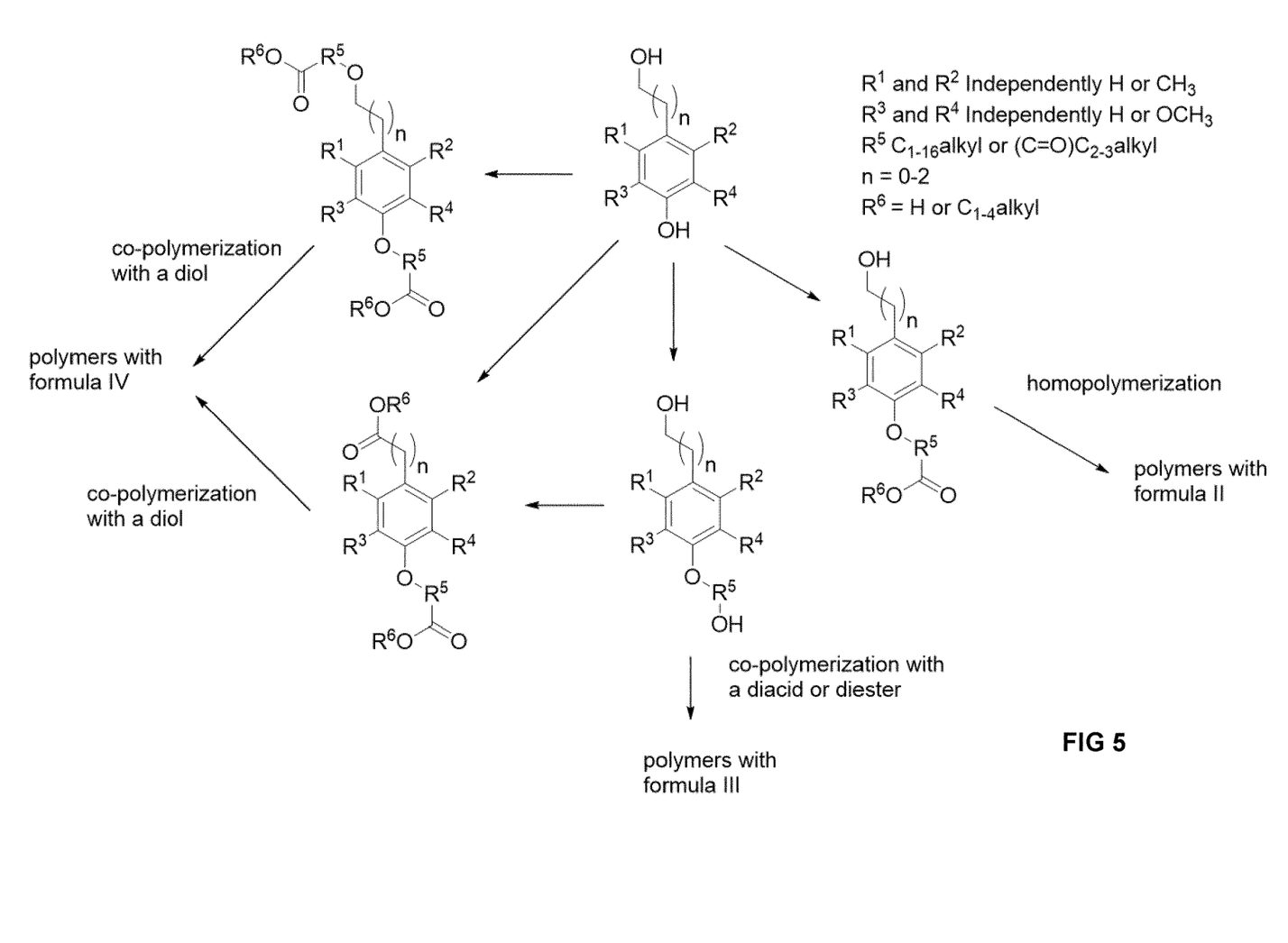
FIG. 5 represents Scheme I, which is summarizing the polymerisation reactions according to aspects of the invention.

The polymerisation reactions described above can be summarized by Scheme I shown in FIG. 5.

The invention is also directed to the use of the polyesters according to the invention. The polyesters can be used in different applications, mainly as a replacement of semi-aromatic polyesters, of which PET is the best know example. Possible applications of the polyesters according to the invention are textile (apparel and house furnishing), bottle (water and other drinks, as well as other liquids such as detergents) and films for packaging. Moreover, the polyesters according to the invention can be used as a finish on wood products. Fibers from the polyesters according to the invention may be used for car tire reinforcements and as insulating and cushioning material. In these applications the polyesters according to the invention can replace existing polyesters.

It is further noted that the invention relates to all possible combinations of features described herein, preferred in particular are those combinations of features that are present in the claims.

It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

BRIEF DESCRIPTION OF THE DRAWINGS

Aspects of the invention will now be described in more detail with reference to the appended drawings, wherein same reference numerals illustrate same features.

DESCRIPTION OF EMBODIMENTS

The invention will now be explained by way of the following examples without however being limited thereto.
Monomer Extraction from Depolymerized Lignin Oil Dihydroconiferyl alcohol (DCA, 4-(3-Hydroxypropyl)-2-methoxyphenol) can be extracted from depolymerized oil rich in this compound, following an extraction process.

According to an embodiment, the DCA in the depolymerized lignin is extracted by water. The lignin oil is mixed with water in a mass ratio of preferably between 1:1 and 1:100 (grams lignin oil to ml (or gram) water), more preferably between 1:2 and 1:50, most preferably between 1:5 and 1:20.

The mixture of lignin in water may be heated, advantageously to a temperature equal to the boiling point of water. Next, the mixture is advantageously stirred (stirring step) for a duration between 5 minutes and 72 hours, preferably between 10 minutes and 48 hours, most preferably between 20 minutes and 24 hours. When the stirring step is finished, the mixture is advantageously let to cool, e.g. to room temperature (cooling step), and let to settle down (settling step). The water layer, obtained during the settling step, is advantageously filtered and collected (collection step).

The remaining lignin mixture may be submitted to one or more additional extraction cycles. Several extraction cycles can be performed to advantageously increase the yield of extracted monomer. The combined water layers are advantageously mixed and the water is removed, leading to a mixture highly enriched in DCA and further comprising some DCA dimers.

Alternatively, the extraction of DCA from the water phase may be performed by using an organic solvent, followed by concentrating the DCA extracted from the lignin-water mixture. The mixture can be further purified by column chromatography or by crystallization.

According to another embodiment, depolymerized lignin might be first fractionated. Fractionation is advantageously performed by using an organic solvent in which DCA is soluble, such as, but no limited to, diethyl ether, ethyl acetate, methanol, ethanol, tetrahydrofuran, dioxane, dichloromethane, acetone, ethyl methyl ketone.

Advantageously, the fractionation process comprises a first step of mixing an amount of lignin in a volume of solvent, preferably in a ratio between 1:1 and 1:100 grams lignin to ml solvent, more preferably between 1:2 and 1:50, most preferably between 1:5 and 1:20.

The mixture of lignin in solvent may be heated, advantageously to a temperature equal to the boiling point of the solvent. Advantageously, the mixture is stirred for a duration between 10 minutes and 72 hours, preferably between 1 hour and 48 hours, most preferably between 2 hours and 24 hours. After the stirring step, the mixture may optionally be cooled (cooling step). The soluble fraction is advantageously filtered and collected (collection step), and the solvent is advantageously removed.

Sequential fractionations, using different solvents, are possible. The solvent fractionated lignin will be enriched in DCA compared to the starting lignin oil. This fraction is then advantageously fractionated with water. The lignin oil is advantageously mixed with water in a mass ratio of preferably between 1:1 and 1:100 grams fraction to ml water, more preferably between 1:2 and 1:50, most preferably between 1:5 and 1:20. The mixture of lignin fraction in water may be heated, advantageously to a temperature equal to the boiling point of water. Advantageously, the mixture is stirred for a duration between 5 minutes and 72 hours, preferably between 10 minutes and 48 hours, most preferably between 20 minutes and 24 hours. After the stirring step, the mixture is advantageously let to cool (cooling step) and to settle down (settling step). The water layer, obtained during the settling step, is advantageously filtered and collected (collection step).

The remaining lignin mixture may be submitted to one or more additional extraction cycles. Several extraction cycles can be performed to advantageously increase the yield of extracted monomer. The combined water layers are advantageously mixed and the water is removed, leading to a mixture highly enriched in DCA and further comprising some DCA dimers.

Alternatively, the extraction of DCA from the water phase may be performed by using an organic solvent, followed by concentrating the DCA extracted from the mixture. The mixture can be further purified by column chromatography, distillation or by crystallization.

Chemical Synthesis of the Monomers

Example 1: Transformation of Phenolic Hydroxyl Group in Aliphatic Hydroxyl. Preparation of 3-(4-(2-hydroxyethoxy)-3-methoxyphenyl)propan-1-ol (monomer 1)

(monomer 1)

Figure 1:
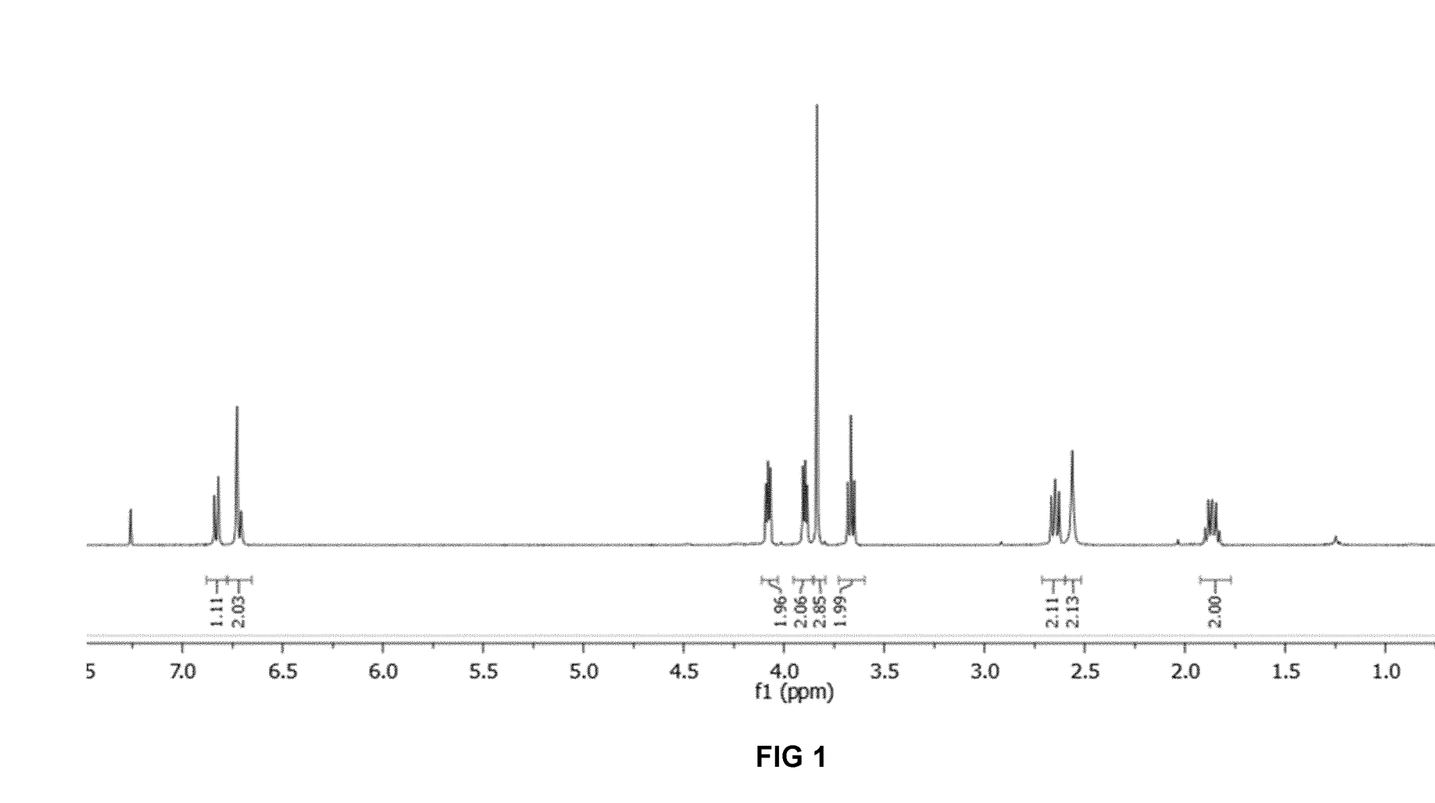
FIG. 1 represents the $^1$H NMR spectrum of monomer 1.

3 grams (1 equiv.) of dihydroconiferyl alcohol (4-(3-hydroxypropyl)-2-methoxyphenol) was mixed with ethylene carbonate (20 equiv.) and $K_2CO_3$ (2 equiv.). Alternatively, it was dissolved in DMF and mixed with 2 equivalents of ethylene carbonate and 2 equivalents of $K_2CO_3$. It was stirred at 120° C. for 20 h. After cooling down it was quenched with 10 ml of water. 50 ml of ethylacetate (EtOAc) and 50 ml of brine were added. The organic phase was washed with ethyl acetate, and it was purified by column chromatography using 100% EtOAc. The product was isolated as a colorless oil and characterized by means of $^1$H NMR (400 MHz, $CDCl_3$) δ 6.83 (d, J=7.8 Hz, 1H), 6.71-6.70 (m, 2H), 4.08 (m, 2H), 3.90 (m, 2H), 3.84 (s, 3H), 3.67 (t, J=6.4 Hz, 2H), 2.65 (m, 2H), 1.88 (m, 2H) (FIG. 1).

Example 2: Preparation of 3-(4-(3-hydroxypropoxy)-3-methoxyphenyl)propan-1-ol (Monomer 2)

(monomer 2)

4 grams (1 equiv.) of dihydroconiferyl alcohol (4-(3-hydroxypropyl)-2-methoxyphenol) was dissolved in isopropyl alcohol, followed by the addition of sodium hydroxide (1 gram, 26.5 mmol, 1.2 eq.). The mixture was stirred for 30 minutes, after which 3-chloro-1-propanol (2.4 ml, 28 mmol, 1.3 eq.) was added. After the addition of 3-chloro-1-propanol, the reaction flask was brought to reflux for at least 24 hours. When the reaction was finished, the solvent was removed and water was added. The now aqueous mixture was extracted using ethyl acetate, and the organic phases were combined and washed using brine. The solvent was dried using magnesium sulphate, filtered and removed under vacuum. The crude was purified by column chromatography, using ethyl acetate as the mobile phase. The product was obtained as a clear liquid in 86% yield, and solidified afterwards as a white solid.

Figure 2:
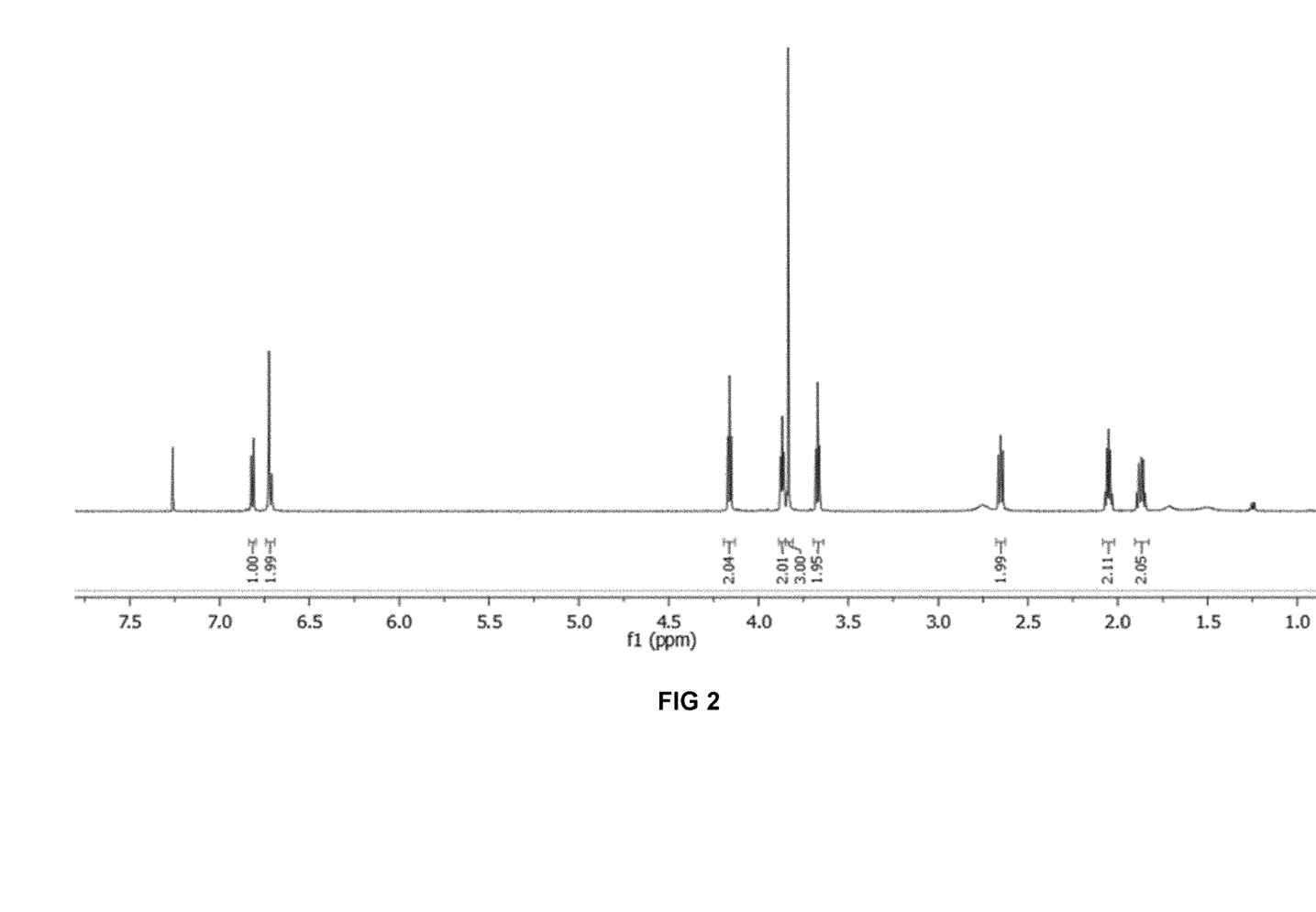
FIG. 2 represents the $^1$H NMR spectrum of monomer 2.

The product was isolated and characterized by $^1$H NMR (600 MHz, $CDCl_3$) δ 6.82 (d, J=7.7 Hz, 1H), 6.73-6.70 (m, 2H), 4.16 (t, J=5.8 Hz, 2H), 3.87 (t, J=5.5 Hz, 2H), 3.83 (s, 3H), 3.67 (t, J=6.4 Hz, 2H), 2.75 (br), 2.65 (t, J=7.5 Hz, 2H), 2.05 (tt, J=5.8, 5.5 Hz, 2H), 1.87 (tt, J=7.5, 6.4 Hz, 2H), 1.71 (br). $^{13}$C NMR (101 MHz, $CDCl_3$) δ 149.44, 146.40, 135.38, 120.37, 113.60, 112.08, 68.71, 62.29, 61.58, 55.90, 34.49, 31.89, 31.86. HRMS: $[M+H]^+$ calculated for 241.1434, found 241.1436 (FIG. 2).

Similar transformations of the phenolic hydroxyl group in aliphatic hydroxyl were possible in the manufacturing of the following monomers.

Example 3: Preparation of 3-(4-(3-hydroxypropoxy)-3,5-dimethoxyphenyl)propan-1-ol (Monomer 3)

(monomer 3)

4 grams (1 equiv.) of 3-(4-(3-hydroxypropoxy)-3,5-dimethoxyphenol was mixed with 3-chloro-1 propanol (1.3 eq.) and NaOH (1.2 eq.).

The product was isolated and characterized by $^1$H NMR (400 MHz, $CDCl_3$) δ 6.42 (s, 2H), 4.11 (t, J=5.6 Hz, 2H), 3.91 (t, J=5.5 Hz, 2H), 3.83 (s, 6H), 3.69 (t, J=6.4 Hz, 2H), 3.37 (s, 1H), 2.66 (t, J=7.6 Hz, 2H), 2.06 (s, 1H), 1.99-1.84 (m, 4H). $^{13}$C NMR (101 MHz, CDCl$_3$) δ 153.02, 138.00, 135.03, 105.36, 72.20, 62.17, 61.38, 56.09, 34.36, 32.64, 32.16. HRMS: [M+H]$^+$ calculated for 271.1540, found 271.1539.

Example 4: Preparation of a Mixture of 3-(4-(3-hydroxypropoxy)-3-methoxyphenyl)propan-1-ol and 3-(4-(3-hydroxypropoxy)-3,5-dimethoxyphenyl) propan-1-ol (Monomer 4)

(monomer 4)

1 equiv. of dihydroconiferyl alcohol (4-(3-hydroxypropyl)-2-methoxyphenol) and (1 equiv.) of 3-(4-(3-hydroxypropoxy)-3,5-dimethoxyphenol was mixed with 3-chloro-1 propanol (3.0 equiv.) and NaOH.

Example 5: Transformation of Phenolic Hydroxyl Group in Carboxylic Acid. Preparation of 2-(4-(3-hydroxypropyl)-2-methoxyphenoxy)acetic Acid (Monomer 5)

(monomer 5)

4 grams (1 equiv.) of dihydroconiferyl alcohol (4-(3-hydroxypropyl)-2-methoxyphenol) was mixed in water with NaOH (1.2 equiv.) and stirred for 30 min at 60° C. Sodium chloroacetate (1.2 equiv.) was added and stirred at 60° C. for 20 h. The reaction was allowed to cool down and HCl (36%) was added until pH 1, and the mixture was stirred for 30 min. A white precipitate was formed, which was filtered, washed with H$_2$O and dissolved with 50 ml of EtOAc. The organic layer was dried with MgSO$_4$ and the solvent removed under vacuum. The residue was purified by recrystallization (dichloromethane).

Figure 3:
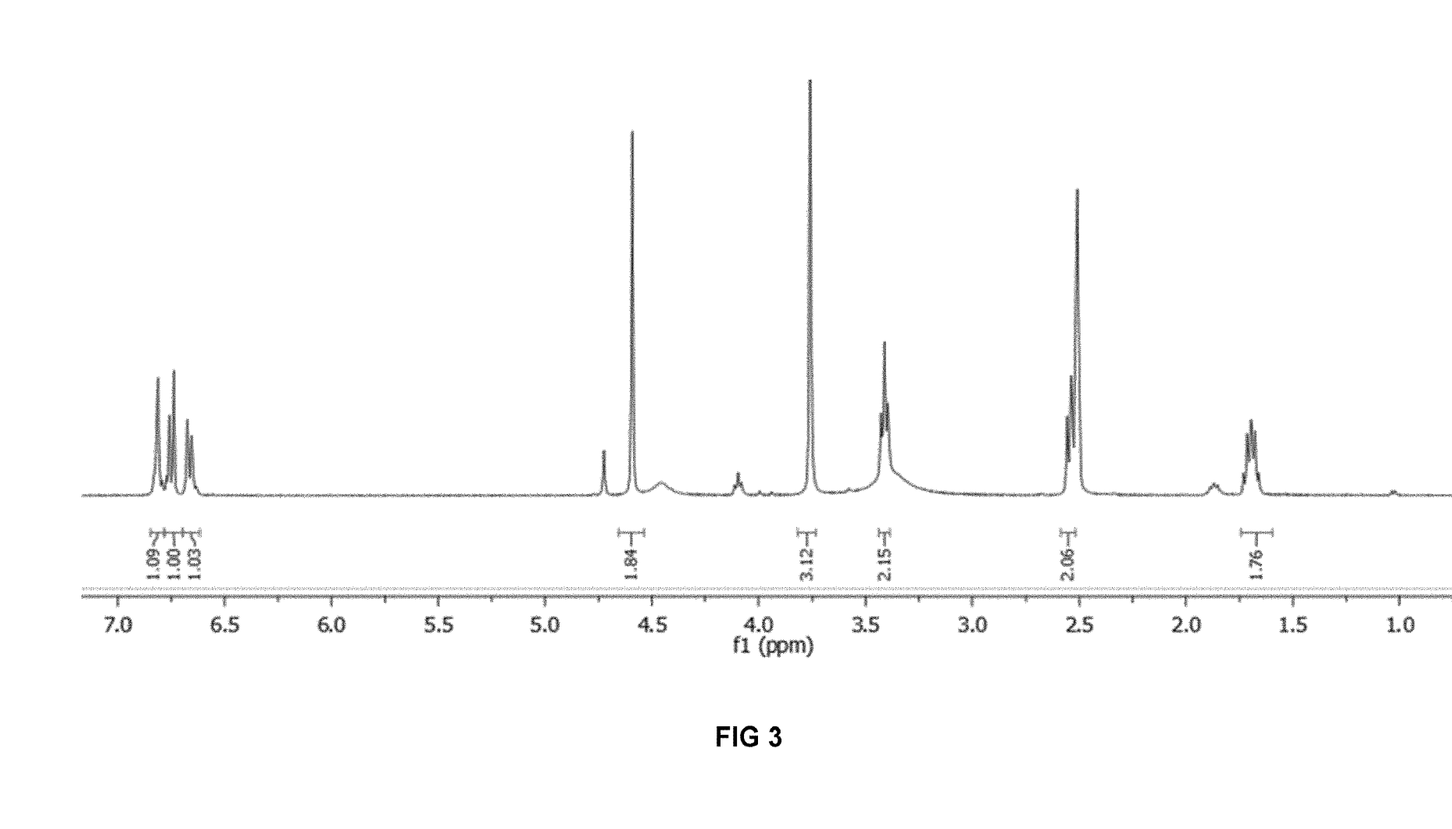
FIG. 3 represents the $^1$H NMR spectrum of monomer 5.

The product was isolated and characterized by $^1$H NMR (400 MHz, DMSO-d6) δ 6.81 (d, J=1.2 Hz, 1H), 6.75 (d, J=8.2 Hz, 1H), 6.66 (dd, J=8.2, 1.3 Hz, 1H), 4.59 (s, 2H), 4.45 (br), 3.76 (s, 3H), 3.41 (t, J=6.4 Hz, 2H), 2.57-2.49 (m, 2H), 1.69 (tt, J=7.6, 6.5 Hz, 2H). $^{13}$C NMR (101 MHz, DMSO-d6) δ 170.38, 148.74, 145.22, 135.57, 119.88, 113.44, 112.69, 65.27, 60.14, 55.49, 34.48, 31.25. HRMS: [M+H]$^+$ calculated for 241.1071, found 241.1071 (FIG. 3).

Similar transformations of the phenolic hydroxyl group in carboxylic acid were possible in the manufacturing of the following monomers.

Example 6: Preparation of 4-(4-(3-hydroxypropyl)-2-methoxyphenoxy)-4-oxobutanoic Acid (Monomer 6)

(monomer 6)

Further modifications of the phenolic and or aliphatic hydroxyl group in the monomers could be used to introduce further carboxylic acids into the building blocks of the polymers according to the invention.

Such further modifications include:

Example 7: Oxidation of Monomer 3 to Dicarboxylic Acid (monomer 7)

(monomer 7)

Example 8: Transformation of Both Phenolic and Aliphatic Hydroxyl Group in Carboxylic (Monomer 8)

(monomer 8)

Synthesis of the Polymers

The above mentioned lignin derived monomers, optionally in combination with dicarboxylic acids or dimethyl esters selected from adipic acid, sebacic acid, dimethyl succinate, dimethyl terephthalate and dimethyl 2,5-furandicarboxylate, were heated above their melting point, which is between 120 and 160° C. The catalyst, Sb$_2$O$_3$ or Ti(O$^i$Pr)$_4$, was added and the mixture was kept stirring under a nitrogen flow for 2-4 h until an increase of viscosity was noticed. In the case of co-polymerizations, the molar ratio of between monomers was in the 0.8-1.2 range.

Afterwards vacuum was applied (2 mbar) and the temperature was increased to 150-180° C. The mixture was kept stirring till the stirring stopped (4-16 h). After letting it cool down, the polymer was dissolved in a 3:7 mixture of $C_2H_2Cl_4/CHCl_3$, and if not fully soluble, it was filtered. The solutions were poured into cold methanol, and filtered through a Buchner funnel. The polymers were dried in a vacuum oven at 40° C. for 24 h. The polymers were characterized by DSC and GPC (Table 1).

Example 9: Co-polymerization of Monomer 2 with Adipic Acid (Polymer 1)

Figure 4:
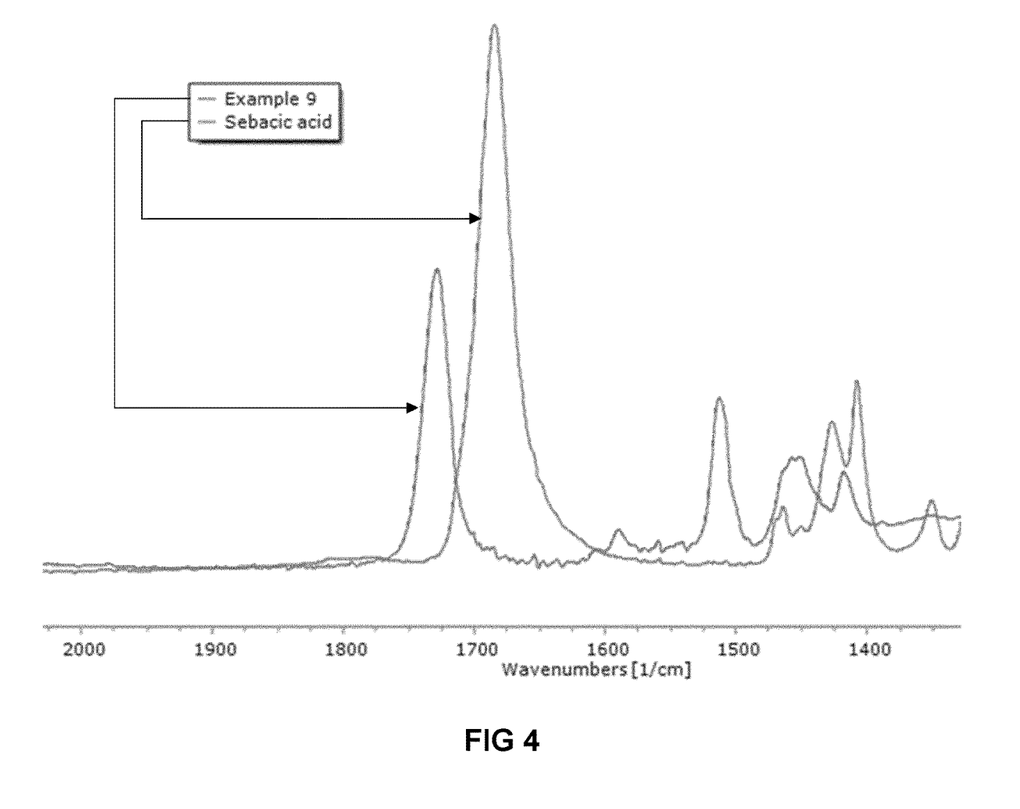
FIG. 4 represents the IR spectrum of the conversion of acid groups to ester bonds in polyester according to example 9.

0.5 g of monomer 1 was mixed at 150° C. with 0.445 g of sebacic acid, and 1 mol % of titanium isopropoxide was added. It was stirred at 150° C. for 16 h, after which it was heated at 180° C. for 3 h under vacuum. Full conversion to the polyester was determined by transformation of acid groups in sebacic acid to ester bonds (FIG. 4). The resulting polymer had a $T_g$ of −16° C.

Analogous co-polymerization reactions are possible for:

Example 10: Co-polymerization of monomer 2 with sebacic acid.

Example 11: Co-polymerization of monomer 3 with adipic acid

Example 12: Co-polymerization of monomer 2 with dimethyl succinate

Example 13: Co-polymerization of monomer 2 with dimethyl terephthalate

Example 14: Co-polymerization of monomer 2 with dimethyl 2,5-furandicarboxylate ethylene Example 15: Homopolymerization of monomer 5

$T_g$: 27° C.; Mw: ≥350000; PDI: 6.5

TABLE 1

Characterization of polymers

| Example | Diacid/diester | $R^1$ | $T_g$ (° C.)[a] | PDI[b] | $M_n$[b] | $M_w$[b] |
|---|---|---|---|---|---|---|
| 9 | Adipic acid, $R^2$ = $(CH_2)_4$ | H | −13 | 2.8 | 36600 | 101400 |
| 10 | Sebacic acid, $R^2$ = $(CH_2)_8$ | H | −27 | 2.8 | 43300 | 123000 |
| 11 | Adipic acid, $R^2$ = $(CH_2)_4$ | $OCH_3$ | −9 | 3.2 | 35000 | 113000 |
| 12 | Dimethyl succinate $R^2$ = $(CH_2)_2$ | H | −10 | 2.5 | 13700 | 34000 |
| 13 | Dimethyl terephthalate $R^2$ = Ph | H | 22 | 2.0 | 7900 | 15900 |
| 14 | Dimethyl furanoate $R^2$ = Furan | H | 12 | 3.3 | 10500 | 35000 |

[a] Determined by DSC.
[b] Determined by GPC.

The invention claimed is:
1. A lignin-based polyester comprising the following repeating unit of formula I:

wherein:
R¹ and R² independently represent H or CH₃,
R³ and R⁴ independently represent H or OCH₃,
R⁵ independently represents C₁₋₁₆alkyl-O(C=O)R⁷(C=O); C₁₋₁₆alkyl(C=O); (C=O)R⁷(C=O); C₁₋₁₆alkyl(C=O)OR⁷O(C=O)C₁₋₁₆alkyl; C₁₋₁₆alkyl(C=O)OR⁷ or (C=O)C₂₋₃alkyl(C=O)OR⁷O(C=O)C₂₋₃alkyl,
R⁷ independently represents C₁₋₂₀alkyl; benzene or furan,
R⁶ represents CH₂ or (C=O),
n=0-3,
m≥10.

2. The lignin-based polyester according to claim 1, wherein R⁵ independently represents
C₁₋₁₆alkyl-O(C=O)R⁷(C=O);
C₁₋₁₆alkyl(C=O);
(C=O)C₂₋₃alkyl(C=O);
C₁₋₁₆alkyl(C=O)OR⁷O(C=O)C₁₋₁₆alkyl;
C₁₋₁₆alkyl(C=O)OR⁷; or
(C=O)C₂₋₃alkyl(C=O)OR⁷O(C=O)C₂₋₃alkyl.

3. The lignin-based polyester according to claim 1, comprising a repeating unit of formula II:

(II)

wherein:
R¹ and R² independently represent H or CH₃,
R³ and R⁴ independently represent H or OCH₃,
R⁵ represents C₁₋₁₆alkyl or (C=O)R⁷,
R⁷ represents C₁₋₂₀alkyl; benzene or furan,
n=0-3,
m≥10.

4. The lignin-based polyester according to claim 1, comprising a repeating unit of formula III:

(III)

wherein:
R¹ and R² independently represent H or CH₃,
R³ and R⁴ independently represent H or OCH₃,
R⁵ independently represents C₁₋₁₆alkyl-O(C=O)R⁷(C=O),
R⁷ independently represents C₁₋₂₀alkyl; benzene or furan,
n=0-3,
m≥10.

5. The lignin-based polyester according to claim 1, comprising a repeating unit of formula IV:

(IV)

wherein:
R¹ and R² independently represent H or CH₃,
R³ and R⁴ independently represent H or OCH₃,
R⁵ independently represents C₁₋₁₆alkyl(C=O)OR⁷O(C=O)C₁₋₁₆alkyl;
C₁₋₁₆alkyl(C=O)OR⁷; or (C=O)C₂₋₃alkyl(C=O)OR⁷O(C=O)C₂₋₃alkyl,
R⁷ independently represents C₁₋₂₀alkyl; benzene or furan,
R⁶ represents CH₂ or (C=O),
n=0-3,
m≥10.

6. A process for the preparation of a lignin-based polyester according to claim 1, wherein the polyester is a homopolymer, and wherein a lignin-based monomer is heated in the presence of a catalyst to a temperature of 100-300° C. under a pressure below 10 kPa, wherein the lignin-based monomer is according to formula V:

(V)

wherein:
R¹ and R² independently represent H or CH₃,
R³ and R⁴ independently represent H or OCH₃,
R⁵ represents C₁₋₁₆alkyl, (C=O)R⁷, or (C=O)C₂₋₃alkyl,
R⁷ independently represents C₁₋₂₀alkyl; benzene or furan,
R⁸ represents H or C₁₋₄alkyl,
n=0-3.

7. The process according to claim 6, wherein the catalyst is chosen from a metal oxide, a metal alkoxide, a metal acetate, a (Lewis) acid, or any combinations thereof.

8. The process according to claim 6, wherein the lignin-based monomers are derived by modification of lignin-based precursors with the structure according to formula A:

(A)

wherein:
R$^1$ and R$^2$ independently represent H or CH$_3$,
R$^3$ and R$^4$ independently represent H or OCH$_3$,
R=CH$_3$ or OH,
n=0-4.

9. The process according to claim 8, wherein the lignin-based monomers are obtained by modification of one or more of a phenolic hydroxyl group and an aliphatic hydroxyl group of a lignin-based precursor according to formula A.

10. A process for manufacturing a lignin-based polyester according to claim 1,
wherein the polyester is a copolymer and is prepared by:
copolymerizing lignin-based monomers according to formula VII with a comonomer:

(VII)

wherein:
R$^1$ and R$^2$ independently represent H or CH$_3$,
R$^3$ and R$^4$ independently represent H or OCH$_3$,
R$^5$ independently represents C$_{1-16}$alkyl or (C=O)C$_{2-3}$alkyl,
R$^7$ independently represents C$_{1-20}$alkyl; benzene or furan,
R$^6$ represents H or C$_{1-4}$alkyl,
n=0-3, or
copolymerizing lignin-based monomers according to formula VIII with a comonomer:

(VIII)

wherein:
R$^1$ and R$^2$ independently represent H or CH$_3$,
R$^3$ and R$^4$ independently represent H or OCH$_3$,
R$^5$ independently represents C$_{1-16}$alkyl or (C=O) R$^7$,
R$^7$ independently represents C$_{1-20}$alkyl; benzene or furan,
R$^6$ independently represents H or C$_{1-4}$alkyl,
n=0-3.

11. The process according to claim 10, wherein the lignin-based monomers are derived by modification of lignin-based precursors with the structure according to formula A:

(A)

wherein:
R$^1$ and R$^2$ independently represent H or CH$_3$,
R$^3$ and R$^4$ independently represent H or OCH$_3$,
R=CH$_3$ or OH,
n=0-4.

12. The process according to claim 10, wherein the lignin-based monomers are derived by modification of lignin-based precursors with the structure according to formula A:

(A)

wherein:
R$^1$ and R$^2$ independently represent H or CH$_3$,
R$^3$ and R$^4$ independently represent H or OCH$_3$,
R=CH$_3$ or OH,
n=0-4.

13. The process according to claim 10, wherein the comonomer is a diol or a mixture of diols.

* * * * *